United States Patent
Canney et al.

(10) Patent No.: US 9,565,458 B2
(45) Date of Patent: Feb. 7, 2017

(54) SYSTEMS AND METHODS FOR DETERMINING EFFECTIVENESS OF ASSET INSERTION

(71) Applicant: Canoe Ventures, LLC, Englewood, CO (US)

(72) Inventors: Jason Canney, Highlands Ranch, CO (US); Dan Davies, Elizabeth, CO (US); Ed Knudson, Lakewood, CO (US); Chris Pizzurro, South Salem, NY (US); Joel Hassell, Golden, CO (US); Yong Liu, Aurora, CO (US); Michael Munhall, Highlands Ranch, CO (US)

(73) Assignee: Canoe Ventures, Englewood, CO (US)

( * ) Notice: Subject to any disclaimer, the term of this patent is extended or adjusted under 35 U.S.C. 154(b) by 0 days.

(21) Appl. No.: 14/732,462

(22) Filed: Jun. 5, 2015

(65) Prior Publication Data

US 2016/0360250 A1    Dec. 8, 2016

(51) Int. Cl.

| | |
|---|---|
| *H04H 20/14* | (2008.01) |
| *H04N 21/24* | (2011.01) |
| *H04N 21/258* | (2011.01) |
| *H04N 21/25* | (2011.01) |
| *H04N 21/442* | (2011.01) |
| *H04N 21/2668* | (2011.01) |
| *H04N 21/472* | (2011.01) |

(Continued)

(52) U.S. Cl.
CPC ........ *H04N 21/2408* (2013.01); *H04N 21/252* (2013.01); *H04N 21/25883* (2013.01); *H04N 21/2668* (2013.01); *H04N 21/44204* (2013.01); *H04N 21/44222* (2013.01); *H04N 21/4782* (2013.01); *H04N 21/47202* (2013.01); *H04N 21/812* (2013.01)

(58) Field of Classification Search
CPC ..................... H04N 21/2408; H04N 21/44204; H04N 21/44222
See application file for complete search history.

(56) References Cited

U.S. PATENT DOCUMENTS 6,177,931 B1 *  1/2001  Alexander ......... G06Q 30/0269
                                                        348/565
8,365,213 B1 *  1/2013  Orlowski ........... G06Q 30/0251
                                                        725/13

(Continued)

*Primary Examiner* — Pankaj Kumar
*Assistant Examiner* — Timothy Newlin
(74) *Attorney, Agent, or Firm* — Duft Bornsen & Fettig LLP; Gregory T. Fettig

(57) ABSTRACT

One system herein is operable to determine effectiveness of asset insertion in VOD content. The VOD content is selected by a user through a CPE. The system is operable to analyze upstream internet traffic through a cable television network, to identify household identifications from the upstream internet traffic, and to detect an internet website selected by the user from the upstream internet traffic based on the user's household identification. The system is also operable to couple to a VOD asset insertion system of a headend in the cable television network to detect an asset inserted into the VOD content selected by the CPE, to associate the internet website with the inserted asset, to determine a period of time between insertion of the asset and the selection of the internet website by the user, and to determine an effectiveness of the asset based on the determined period of time.

18 Claims, 7 Drawing Sheets

(51) Int. Cl.
*H04N 21/4782* (2011.01)
*H04N 21/81* (2011.01)

(56) References Cited

U.S. PATENT DOCUMENTS

| | | | |
|---|---|---|---|
| 8,615,514 B1* | 12/2013 | Fernandes | G06F 17/3089 707/728 |
| 8,813,124 B2 | 8/2014 | Tidwell et al. | |
| 9,247,313 B1* | 1/2016 | Lewis | H04N 21/812 |
| 2002/0129363 A1* | 9/2002 | McGuire | H04H 60/33 725/37 |
| 2005/0155056 A1* | 7/2005 | Knee | H04N 7/163 725/35 |
| 2007/0088607 A1* | 4/2007 | Feierbach | G06Q 30/02 705/14.73 |
| 2007/0226058 A1* | 9/2007 | Lorenzen | G06Q 30/02 705/14.41 |
| 2008/0028064 A1* | 1/2008 | Goyal | G06F 17/30864 709/224 |
| 2008/0092158 A1* | 4/2008 | Bhatnagar | H04N 7/17318 725/34 |
| 2008/0104503 A1* | 5/2008 | Beall | H04N 21/4788 715/233 |
| 2008/0263458 A1* | 10/2008 | Altberg | H04L 12/66 715/757 |
| 2008/0282290 A1* | 11/2008 | Malik | G06Q 30/0251 725/42 |
| 2009/0049468 A1* | 2/2009 | Shkedi | G06Q 30/0241 725/34 |
| 2009/0187939 A1* | 7/2009 | Lajoie | G06Q 30/02 725/34 |
| 2009/0204615 A1* | 8/2009 | Samame | G06Q 30/02 |
| 2010/0030744 A1* | 2/2010 | DeShan | G06F 17/3082 715/764 |
| 2010/0131969 A1 | 5/2010 | Tidwell et al. | |
| 2010/0158098 A1 | 6/2010 | McSchooler et al. | |
| 2010/0251305 A1 | 9/2010 | Kimble et al. | |
| 2010/0280876 A1* | 11/2010 | Bowra | G06Q 30/0242 705/14.41 |
| 2011/0016482 A1* | 1/2011 | Tidwell | G06Q 30/00 725/14 |
| 2011/0035272 A1 | 2/2011 | Bhatt et al. | |
| 2011/0078726 A1* | 3/2011 | Rosenberg | G06Q 30/02 725/34 |
| 2011/0179359 A1* | 7/2011 | Nussel | G06Q 30/02 715/738 |
| 2012/0096489 A1* | 4/2012 | Shkedi | H04N 21/4532 725/34 |
| 2012/0124638 A1* | 5/2012 | King | G06Q 10/101 726/1 |
| 2012/0240019 A1* | 9/2012 | Nuzzi | G06F 17/30867 715/205 |
| 2012/0278830 A1* | 11/2012 | Khoshgozaran | G06Q 30/02 725/25 |
| 2013/0042285 A1 | 2/2013 | Downey et al. | |
| 2014/0020017 A1 | 1/2014 | Stern et al. | |
| 2014/0114753 A1* | 4/2014 | Xiao | G06Q 30/02 705/14.49 |
| 2014/0366051 A1 | 12/2014 | Cronk et al. | |
| 2015/0012344 A1* | 1/2015 | Guinn | G06Q 30/0209 705/14.12 |
| 2015/0128162 A1 | 5/2015 | Ionescu | |

* cited by examiner

SYSTEMS AND METHODS FOR DETERMINING EFFECTIVENESS OF ASSET INSERTION

CROSS REFERENCE TO RELATED APPLICATIONS

This patent application is related to commonly owned and co-pending patent application Ser. Nos. 13/628,324, 13/628,360, and 13/628,381 (each having a filing date of Sep. 27, 2012), the entire contents of each of which are incorporated by reference. This patent application is also related to commonly owned and co-pending patent application Ser. No. 14/732,482, the entire contents of which are incorporated by reference.

FIELD OF THE INVENTION

The invention relates to the field of Video On Demand (VOD) systems and more specifically to determining effectiveness of assets inserted into VOD content selections.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content", have designated timeslots in which the sponsors' advertisements, or "assets", are inserted. The content and the inserted assets are then broadcast by the television networks, or "content providers", to the public over federally licensed communication airways, occasionally referred to as linear video distribution.

This "shotgun" approach to advertising proved to be very successful in the beginning. However, as the number of advertisers wishing to sell their goods and services substantially increased, television evolved into a much more complex system of communications. For example, cable television providers and satellite television providers now serve as intermediary "content distributors" between the content providers and the intended public audience. And, the number of content providers has increased accordingly. In this regard, many members of the general public have signed on as customers of the cable/satellite content distributors so as to receive a broader availability of content.

Because the market for content consumption has grown, the number of content distributors has also grown. And, because each of these providers has its own method of content delivery, the manner in which the content and assets are delivered to the customers has become increasingly complex. Generally, the content providers deliver the content to the content distributors with instructions to insert various national assets into the content at certain times. For example, if a company wishes to run a national advertisement campaign targeting a certain television show associated with a particular demographic, the company may purchase one or more timeslots, or "placement opportunities", within that television show from the content provider to air assets advertising the goods and services of the company. The content provider then provides the content to each of the content distributors with directions to insert the assets within the timeslots purchased by the company.

The content distributors may also have certain timeslots available for inserting certain local assets. For example, a content distributor may have "headends" configured in various communities to distribute content to their customers located therein. Each headend receives content from the content providers with various designated timeslots for inserting assets into the content. Some of those timeslots may be designated for local advertisements where companies within the service area of the headend wish to advertise. These companies purchase those timeslots from the content distributor for insertion of their assets to expose the customers to their advertising at the more local level.

As complex as the cable/satellite television has become, certain devices have come along to change and/or circumvent these forms of marketing altogether. The digital recorder, such as that produced by Tivo, is one example of a means for avoiding the asset insertions of marketing strategists. With the digital recorder, the content distributors' customers are able to digitally record entire episodes of content and view that content at their leisure, as opposed to a time established by the content providers. However, these customers can also use the digital recorders to fast-forward or skip through the assets without viewing them, much to the dismay of the asset owners.

In response, content distributors started providing content on a "Video On Demand" (VOD) basis, sometimes referred to as nonlinear video distribution. In VOD, the content provider delivers the content to the content distributor which in turn maintains the content for subsequent and individual distribution to their customers. Thus, a customer may select a desired content through a set-top box (STB) or other device (collectively referred to herein as "customer premise equipment" or "CPE") and watch that content at the customer's leisure. This VOD content is also typically configured with timeslots where assets may be inserted. However, marketing strategists have not been able to determine the effectiveness of asset insertion in VOD content.

SUMMARY

Systems and methods presented herein provide for determining effectiveness of asset insertion in VOD content. In one embodiment, a system determines that effectiveness based on VOD content selected by a user through a CPE. The system includes an engagement detector operable to analyze upstream internet traffic through a cable television network, to identify household identifications (HHIDs) from the upstream internet traffic, and to detect an internet website selected by the user from the upstream internet traffic based on the user's HHID. The system also includes an asset association module communicatively coupled to the engagement detector and to a VOD asset insertion system of a headend in the cable television network, wherein the asset association module is operable to detect an asset inserted into the VOD content selected by the CPE, to associate the internet website with the inserted asset, to determine a period of time between insertion of the asset and the selection of the internet website by the user, and to determine an effectiveness of the asset based on the determined period of time.

The various embodiments disclosed herein may be implemented in a variety of ways as a matter of design choice. For example, the embodiments may take the form of physical machines, computer hardware, software, firmware, or combinations thereof. In one embodiment, a computer readable medium is operable to store software instructions for directing the asset insertion into content. These software instructions are configured so as to direct a processor or some other processing system to operate in the manner described above.

Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
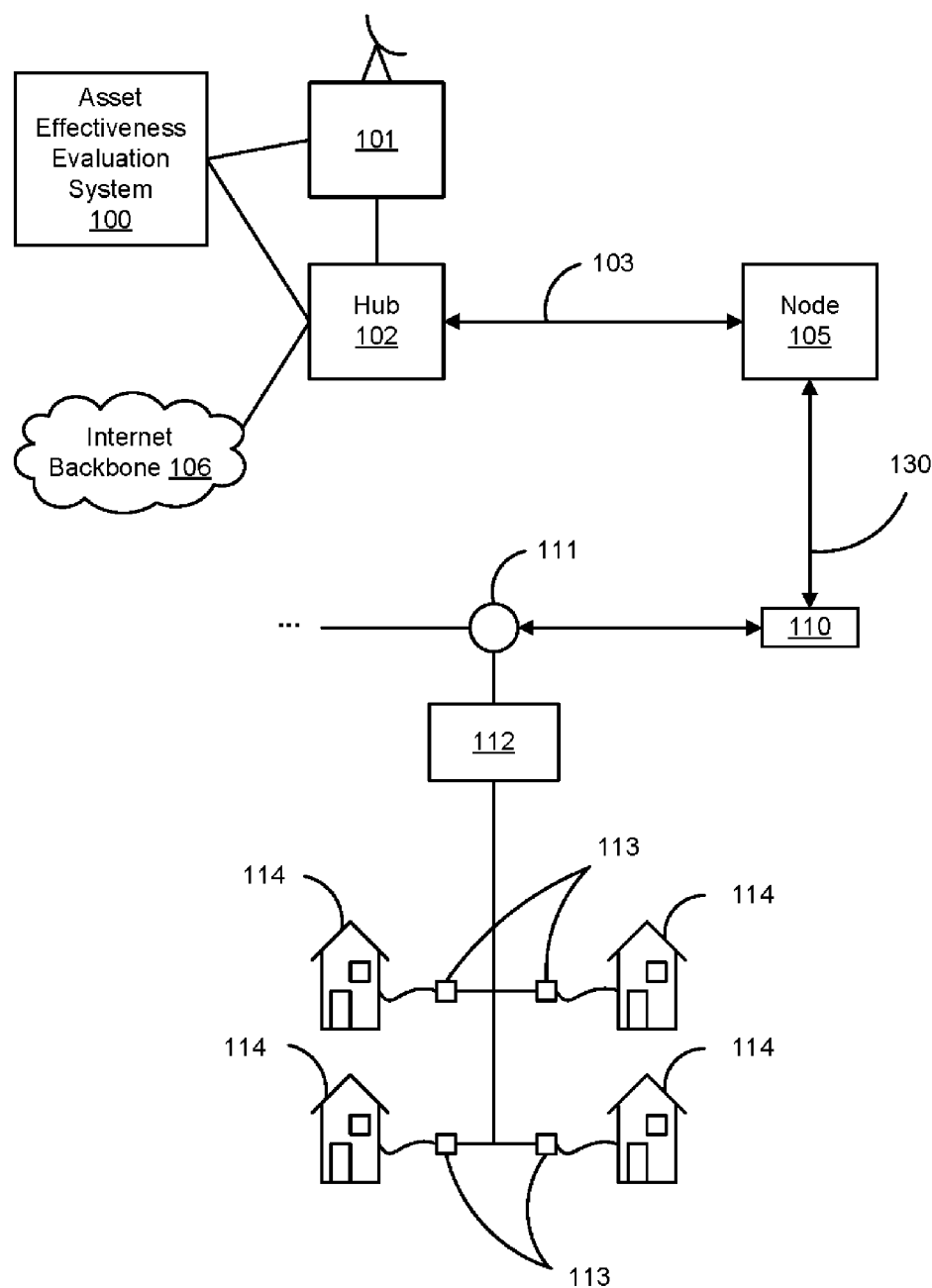
FIG. 1 is a block diagram of an exemplary system for determining effectiveness of asset insertions in VOD content.

FIG. 1 is a block diagram of an exemplary Asset Effectiveness Evaluation System (AEES) 100 for determining effectiveness of asset insertions in VOD content. The AEES 100 is operable in a cable television network employing high speed data services. The cable television network is operable to present VOD content to subscribers (also referred to herein as users and customers). The cable television network is also operable to insert assets (e.g., advertisements) into the VOD content. Such may even include attempts at "targeted advertising" where the assets are chosen and directed towards a particular audience (e.g., based on demographics and the like). The AEES 100 is operable to monitor the assets that are inserted into the VOD content and determine the effectiveness of those assets being viewed by the subscribers. For example, the AEES 100 may determine how likely a particular advertisement inserted into VOD content influenced a particular subscriber towards an owner of the advertisement.

The cable television network includes a headend 101 configured with an upstream hub 102 (e.g., a Cable Modem Termination System, "CMTS") coupled to a downstream node 105. The headend 101 is the source for various television signals. For example, antennas of the headend 101 may receive television signals that are converted as necessary for transmission to the hub 102. The hub 102 typically conveys the television signals over digital links to the node 105. Several hubs may be connected to a single headend 101 and the hub 102 may be connected to several nodes 105.

Downstream, in homes/businesses 114 are devices called the cable modems (shown below). A cable modem acts as a host for an Internet Protocol (IP) device such as personal computer. Downstream digital transmissions are continuous and are typically monitored by many cable modems. Upstream transmissions from the cable modems to the hub 102 are typically conveyed over a shared link by the cable modems that are on-line.

After the downstream signal leaves the node 105, the signal is typically carried by a coaxial cable 130. At various stages, a power inserter 110 may be used to power coaxial line equipment, such as amplifiers or other equipment. The signal may be split with a splitter 111 to branch the signal. Further, at various locations, bi-directional amplifiers 112 may boost and even split the signal. Taps 113 along branches provide connections to subscriber's homes 114 and businesses.

Upstream transmissions from subscribers to the hub 102/headend 101 occur by passing through the same coaxial cable 130 as the downstream signals, in the opposite direction on a different frequency band. The hub 102 connects the subscribers to the Internet backbone 106 that allows the subscriber cable modems to exchange Internet traffic. This, however, is just one exemplary embodiment. Other exemplary embodiments are described below.

The AEES 100 is any system, device, software, or combination thereof operable to detect when assets are inserted into VOD content selections and to process upstream internet traffic to determine the effectiveness of the assets based on times of the inserted assets and subscriber Internet interactions pertaining to those assets. Examples of the AEES 100 include computers, servers, and/or network elements.

Figure 2:
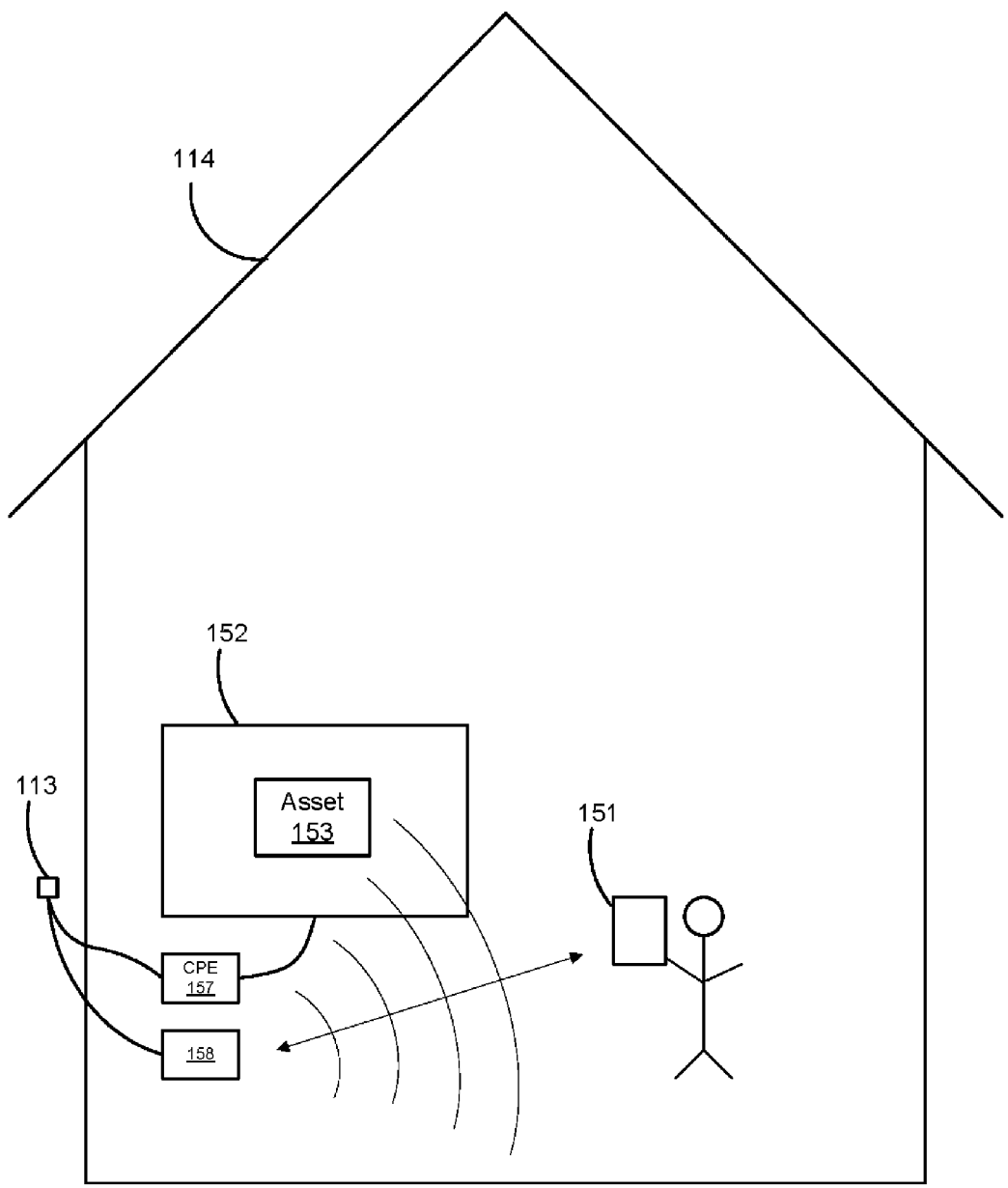
FIG. 2 is a block diagram of an exemplary user environment for accessing VOD content.

In FIG. 2, a block diagram of an exemplary user environment for accessing VOD content is illustrated. In this example, a household 114 includes a monitor 152 (e.g., a television, a computer, etc.) that is operable to display VOD content and the various assets 153 inserted therein. The monitor 152 is communicatively coupled to a CPE 157 that connects to a nearby tap 113. This exemplary environment is also configured with a cable modem 158 that is also coupled to the tap 113 and is operable to link user equipment (UE) 151 to the Internet backbone 106 through the cable television network. Examples of the UE 151 include smart phones, computers, tablet computers, and the like.

As discussed above, the AEES 100 is operable to determine the effectiveness of the asset 153 inserted into the VOD content viewed by subscriber. In doing so, the AEES 100 may determine when the asset 153 is displayed to the subscriber and then determine an amount of time until the subscriber interacts with Internet content associated with the asset 153 through the subscriber's user equipment 151. For example, the asset 153 may be an advertisement for Target department stores that is inserted into the VOD content being viewed by the subscriber. The subscriber, after viewing the asset 153, may be inclined to view the website "target.com" on the subscriber's UE 151. The AEES 100 measures the time between the asset 153 being displayed to the subscriber and the subscriber accessing the website to determine an effectiveness of the asset 153.

The CPE 157 is any device or system capable of providing content to subscribers. For example, a CPE 107 may be a set-top box operable to communicate with a cable television headend or a satellite television network (collectively referred to herein as a cable television network). Additional details pertaining to the asset effectiveness determination are shown and described below. First, an exemplary process 175 of FIG. 3 illustrates some of the operational details associated with the AEES 100.

Figure 3:
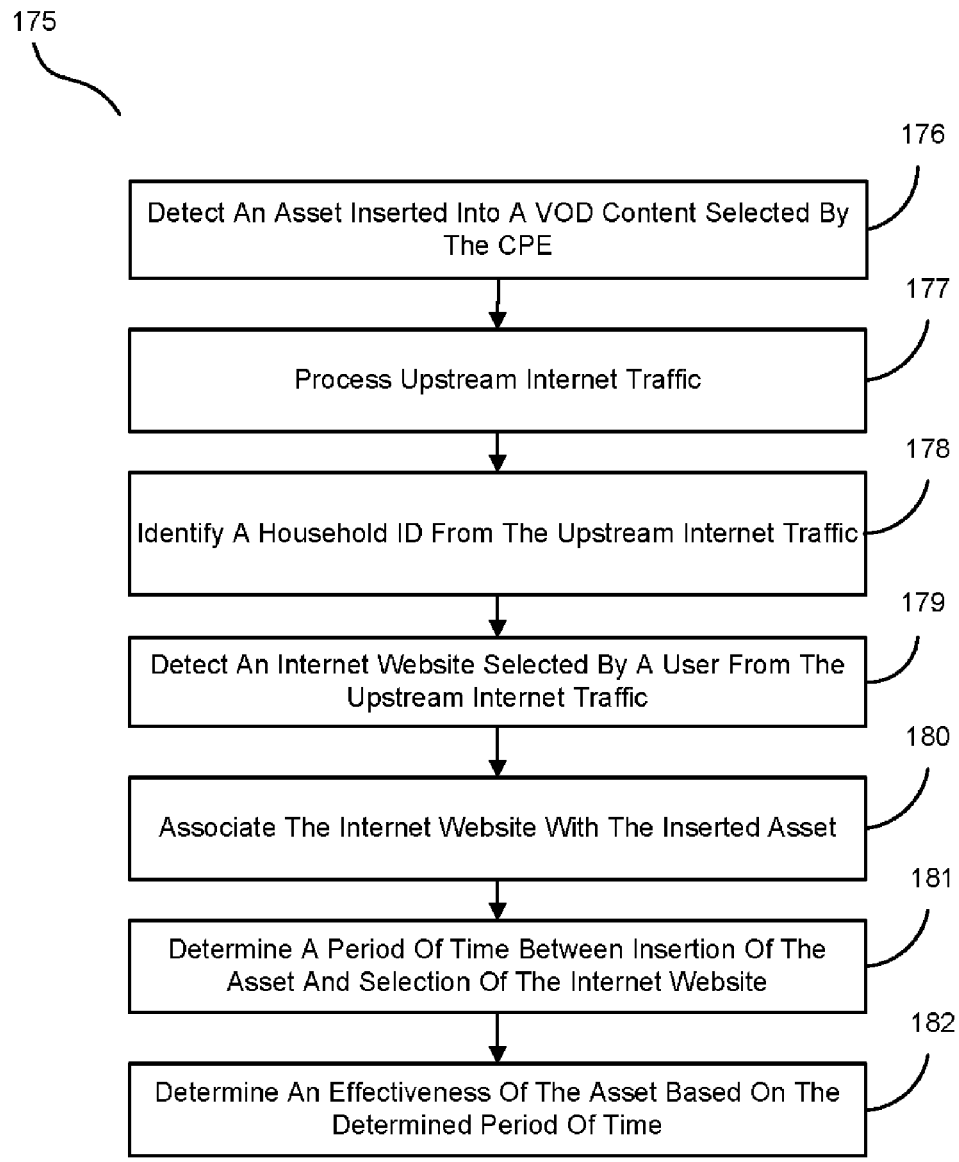
FIG. 3 is a block diagram of an exemplary system for determining effectiveness of asset insertions in VOD content.

In FIG. 3, it is assumed that the cable television network is operating and that a subscriber has selected a VOD content with assets already inserted. The AEES 100 is operable to detect the assets that are inserted into the VOD content, in the process element 176. In the process element 177, the AEES 100 processes upstream Internet traffic. The upstream Internet traffic generally comprises Internet traffic from a plurality of households 114 (and/or businesses) that are communicatively coupled to the node 105. The node 105 conveys the upstream Internet traffic to the hub 102 where it is connected to the Internet backbone 106. The AEES 100 is communicatively coupled to the hub 102 to monitor the Internet traffic. In doing so, the AEES 100 is operable to identify HHID from the upstream Internet traffic, in the process element 178.

With the HHID determined, the AEES 100 detects an Internet site selected by a subscriber from the upstream Internet traffic, in the process element 179. For example, the AEES 100 can identify a particular subscriber's Internet traffic based on the HHID the subscriber's equipment that is transmitted along with the upstream Internet traffic. The AEES 100 can monitor that Internet traffic and determine which websites that subscriber's equipment is searching for. The AEES 100 may perform this operation for each subscriber in the upstream Internet traffic.

With the upstream Internet traffic of the subscriber being monitored by the AEES 100 and a priori knowledge of the assets inserted into the VOD content selected by the subscriber, the AEES 100 is operable to associate the Internet websites with the inserted assets, in the process element 180, as exemplarily discussed above with the Target.com website and the Target department store asset. From there, the AEES 100 is operable to determine a period of time between the insertion of the asset and selection of the Internet website, in the process element 181, and then determine an effectiveness of the asset based on that time, in the process element 182. The AEES 100 is also operable to privatize the subscriber's Internet usage so that it is not shared.

Figure 4:
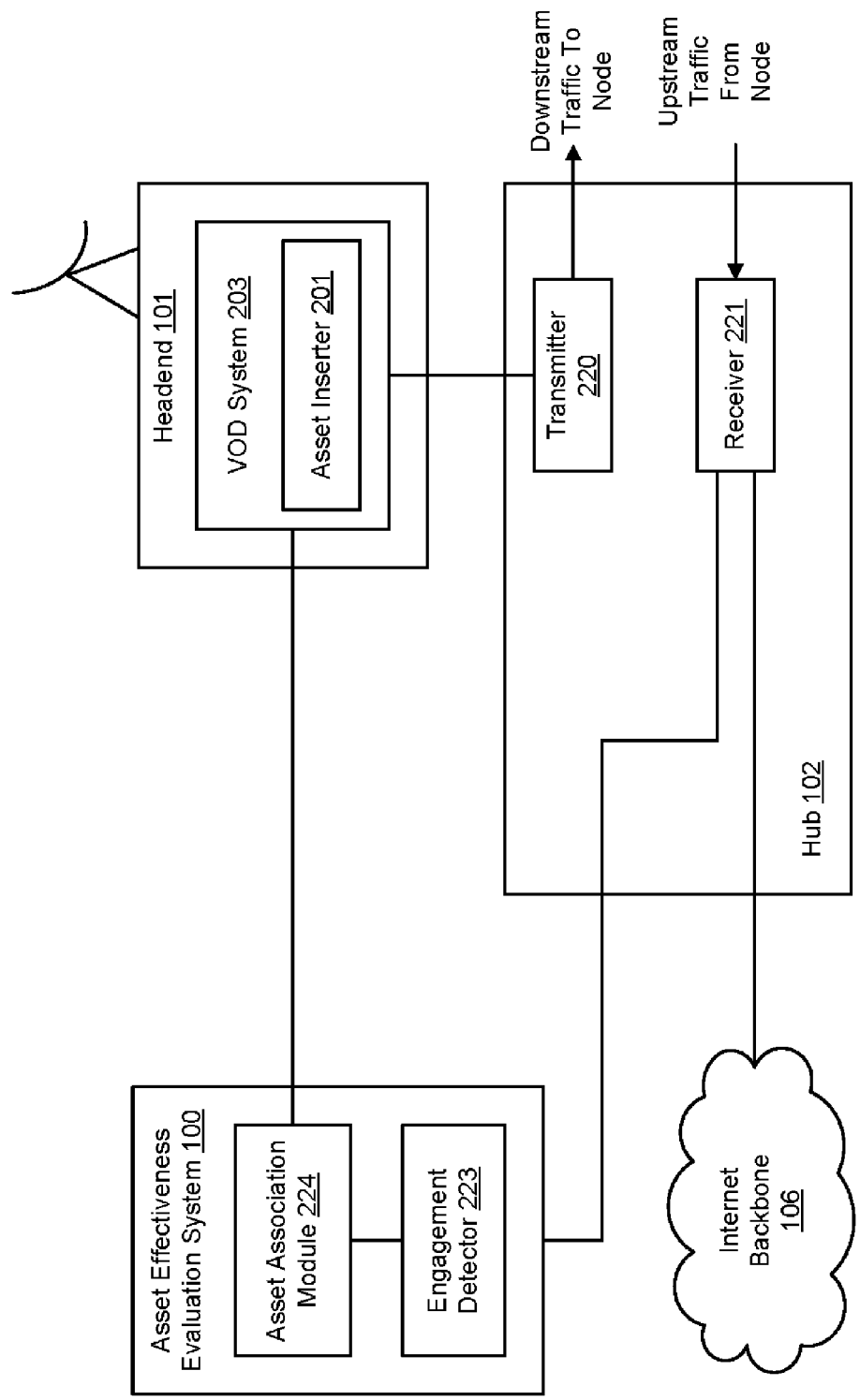
FIG. 4 is a block diagram of an exemplary asset inserter operable with a VOD system.

In FIG. 4, an exemplary embodiment of the AEES 100 is illustrated in FIG. 3 interacting with a VOD system 203 of a cable television network. In this embodiment, the AEES 100 comprises an asset association module 224 and an engagement detector 223. The asset association module 224 is communicatively coupled to the VOD system 203 of the headend 101. The VOD system 203 is any combination of device, system, and software operable to deliver VOD content to subscribers via a hub 102. The VOD system 203 comprises an asset server 201 that is operable to select assets for insertion into the VOD content selected by the subscribers. When the assets are inserted into the VOD content, the VOD system 203 transfers that VOD content to the transmitter 220 for delivery to a particular subscriber requesting the VOD content (i.e., via downstream traffic to a node 105).

The asset association module 224 is operable to detect times when VOD content and assets are delivered to the subscribers on a subscriber by subscriber basis. For example, the VOD content delivered by the VOD system 203 may have designated timeslots or "placement opportunities" (described in greater detail below) that are used to insert assets for delivery to a subscriber viewing the VOD content. When the content is delivered to the subscriber, times associated with starting, stopping, and pausing the VOD content as well as the asset insertion times of that VOD content may be detected by the asset association module 224.

The asset association module 224 is also operable to determine a relative effectiveness of assets inserted into the VOD content by the asset inserter 201. For example, based on a time when an actual asset is viewed by the subscriber in the VOD content and a time it takes for the subscriber to interact with Internet content pertaining to that asset, the asset association module 224 can estimate how effective an asset was. A short duration between the time in which the asset is viewed by the subscriber and the time that the subscriber interacts with Internet content pertaining to that asset generally indicates a highly effective asset. A longer duration generally indicates a less effective asset.

The engagement detector 223 is communicatively coupled to the receiver 221 of the hub 101 to detect Internet interactions of subscribers. For example, as the asset association module 224 detects times of the content and assets therein being observed by a particular subscriber, the engagement detector 223 monitors Internet traffic from subscribers in the upstream traffic from the node. The engagement detector 223 may be operable to identify the subscribers based on their HHIDs associated with their CPEs 157. Thus, the engagement detector 223 can determine when the particular subscriber interacts with Internet contact related to the assets in the VOD content selected by the subscriber.

To illustrate, a subscriber of the cable television network may select a particular VOD content available on that network through the VOD system 203. The VOD system 203, based on information about the subscriber (e.g., demographics, location, VOD content selection, etc.) may direct certain assets to be inserted into that VOD content selection. In this example, one of those assets may be an advertisement related to Ford trucks. The asset association module 224 determines when that Ford truck advertisement is observed by the subscriber. Then, if the subscriber goes to the Ford website on user equipment 151 as illustrated in FIG. 2, the engagement detector 223 determines the time in which the subscriber observed the Ford website on that user equipment 101. From there, the asset association module 224 determines how effective that Ford truck advertisement was based on, among other things, those times.

This process of determining asset effectiveness can be mathematically modeled. For example, the embodiments herein may employ an "Additive Hazard" attribution model that provides for multi-channel attribution. The Additive Hazard model theorizes that conversion happens because of the cascading effect of multiple channels a user is exposed to. The effect of a particular channel can be described by the strength of the effect of the channel over a period of time with a decay function. The cascading effect is the additive effect of all channels involved.

A minimize-maximize algorithm can be employed in an iterative manner to estimate the effect and decay parameters of channels by using collected channel viewing data and sales data (i.e., data pertaining to actual purchases by users). For example, the asset association module 224 may employ a lower bound function $Q(\theta|\theta^{(t)})$, where $\theta=\{\beta,\omega\}$ and $\beta$ is a strength of impact coefficient of an asset and $\omega$ is a time decaying property of the asset (e.g., the time between the viewing of the asset and its actual interaction). This lower bound function may be written as:

$$Q(\theta | \theta^{(t)}) = \sum_{X_u=1} \sum_i p_i^u \log \frac{\beta_{a_i^u} \omega_{a_i^u} e^{\left(-\omega_{a_i^u}(T_u - t_i^u)\right)}}{p_i^u} -$$
$$\sum_i \beta_{a_i^u}\left(1 - \exp(-\omega_{a_i^u}(T_u - t_i^u))\right), \text{ where}$$

Equation (1)

$$p_i^u \begin{cases} \frac{\beta_{a_i^u} \omega_{a_i^u} \exp(-\omega_{a_i^u}(T_u - t_i^u))}{\sum_{i=1}^{t_u} \beta_{a_i^u} \omega_{a_i^u} \exp(-\omega_{a_i^u}(T_u - t_i^u))}, X_u = 1. \\ 0, X_u = 1 \end{cases}$$

Equation (2)

$p_i^u$ reveals the contribution of advertising channels for the conversion of user u. Specifically, $p_i^u$ represents the contribution of the i-th advertising channel for the conversion user u at time $T_u$ if $X_u=1$.

The following two properties hold for $Q(\theta|\theta^{(t)})$:

$$\mathcal{L}_{(\theta)} \geq Q(\theta|\theta^{(t)}), \forall \theta$$

Equation (3)

$$\mathcal{L}_{(\theta^{(t)})} \geq Q(\theta^{(t)}|\theta^{(t)}).$$

Equation (4)

Let $\theta^{(t+1)} = \max_\theta Q(\theta|\theta^{(t)})$, then $$\mathcal{L}_{(\theta^{(t+1)})} \geq Q(\theta^{(t+1)}|\theta^{(t)})$$

Equation (5)

$$\mathcal{L}_{(\theta^{(t+1)})} \geq Q(\theta^{(t)}|\theta^{(t)}) = \mathcal{L}_{(\theta^{(t)})},$$

Equation (6)

showing that $\mathcal{L}$ increases monotonically during the iterations. It can also be shown that the iterations convert to a local optimal $\mathcal{L}$.

By optimizing $Q(\theta|\theta^{(t)})$, all variables β and ω can be optimized independently with closed form solutions such that the non-negativity constraints are naturally taken care of. Then, optimizing with respect to $\beta_k$ and letting $$\frac{\partial Q}{\partial \beta_k} = 0$$

results in $$\frac{\partial Q}{\partial \beta_k} = \frac{\sum_{u,i,X_u=1,a_i^u==k} p_i^u}{\beta_k} - \sum_{i,a_i^u==k} 1 - e^{-\omega_k^{(t)}(T_u - t_i^u)}.$$

Equation (7)

And, $\beta_k$ can be updated as follows:

$$\beta_k = \frac{\sum_{u,i,X_u=1,a_i^u==k} p_i^u}{\sum_{i,a_i^k==k} 1 - e^{-\omega_k^{(t)}(T_u - t_i^u)}}.$$

Equation (8)

Optimizing with respect to $\omega_k$ and letting $$\frac{\partial Q}{\partial \omega_k} = 0$$

results in $$\frac{\partial Q}{\partial \omega_k} = \sum_{u,i,X_u==1,a_i^u==k} p_i^u\left(\frac{1}{\omega_k^u} - (T_u - t_i^u)\right) -$$
$$\sum_{i,a_i^u==k} \beta_k^{(t)}(T_u - t_i^u)e^{-\omega_k^{(t)}(T_u - t_i^u)}.$$

Equation (9)

Then, $$\omega_k = \frac{\sum_{u,i,X_u==1,a_i^u==k} p_i^u}{\sum_{u,i,a_i^u==k} p_i^u\left(\frac{1}{\omega_k^u} - (T_u - t_i^u)\right) + \beta_k^{(t)}(T_u - t_i^u)e^{-\omega_k^{(t)}(T_u - t_i^u)}}.$$

Equation (10)

After fitting the Additive Hazard model, a conversion probability that a user touches one advertisement channel k is established as the contribution of the channel k. The Additive Hazard models the dynamics of the influences of an advertisement on user conversion by explicitly modeling the strength of influence and its time-decaying property. Thus, in calculating the contributions of any advertisement, a pre-defined observe window T is established. And, the probability of conversion in the time window T can be formulated as:

$$P(C|\beta_k,\omega_k,T)=1-\exp(-\beta_k(1-\exp(-\omega_k T))).$$

Equation (11)

To summarize, the estimation process utilizes the above formulas to calculate the values of the parameters. To start the estimation process, the asset association module 224 draws β from a uniform distribution unif(0,1) and ω from a uniform distribution unif(1,10). Then, as part of a data generation step, the asset association module 224 establishes the time window to 10. Impression data from the engagement detector 223 is input to cluster nodes and evenly/randomly distributed. The asset association module 224 then calculates a set of values $V_m$ and combines the values to calculate the β and ω values. This process iterates until the parameters β and ω converge. The attribution of a channel is then calculated by taking the conversion C and the probability P that a user touches a single advertisement channel k, during a pre-defined observation window T, using the effect ($\omega_k$) and decay ($\beta_k$) parameters of the channel, as illustrated in Equation (11).

Figure 5:
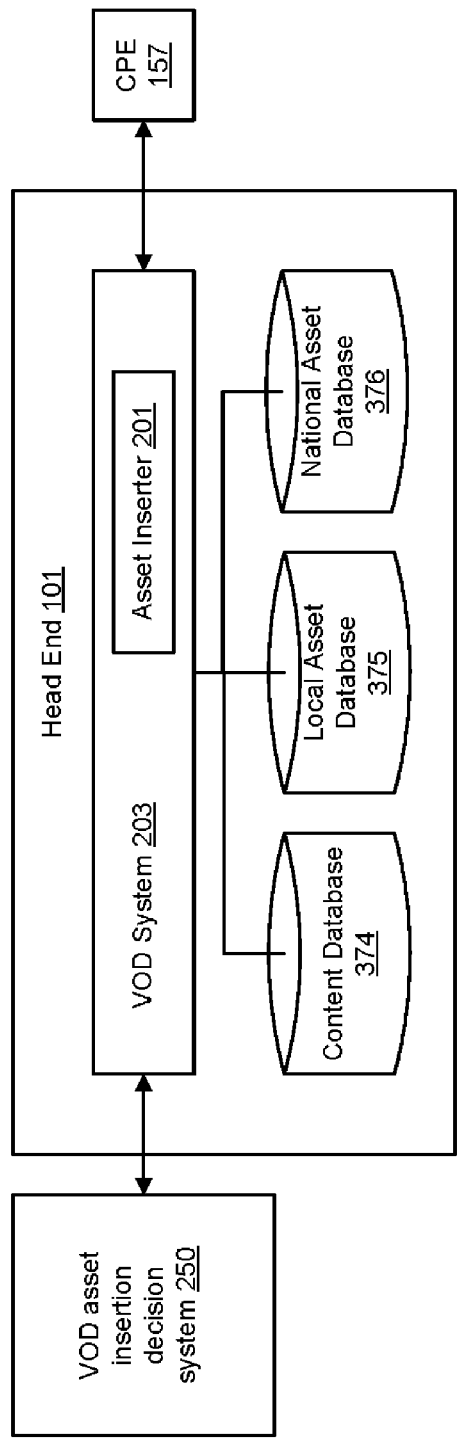
FIG. 5 is a block diagram of an exemplary timing diagram of a VOD content selection with asset placement opportunities.

FIG. 5 is a block diagram of an exemplary VOD asset insertion decision system 250 operable with a VOD system 203 (also known as a "VOD back office system") of a headend 101. The headend 101 is generally any system operable to receive content for processing and distribution to a CPE 157 (e.g., over a cable television infrastructure or from satellite). For example, the headend 101 may receive content from content providers over television signals for distribution to the customers of a cable content distributor via the customer premise equipment (CPE) 157, such as a set-top box (STB), a gaming console, a smart phone, an electronic tablet, a computer, or the like.

The VOD system 203 of the headend 101 provides the VOD content to the CPE 157 when desired by the customer. For example, the headend 101 may receive the content from the content providers and maintain that content within a content database 374. The headend 101 may also maintain local assets in a local asset database 375 and national assets in a national asset database 376. When a particular content is selected by the user of the CPE 157, an asset inserter 201 of the VOD 203 accesses the content database 374 to retrieve the selected content and deliver that content to the CPE 157. The VOD 203 is any system or device that is operable to deliver video content to the CPE 157 when directed by the CPE 157. The databases 374, 375, and 376 are any systems or devices operable to store and maintain data, audio, and/or video for subsequent distribution to the CPE 157. For example, the databases 374, 375, and 376 may be operable within a computer system that stores the video and audio (e.g., MPEG) content and assets such that they may be accessed by the VOD 203 and delivered to the CPE 157 when desired by the user of such.

Figure 6:
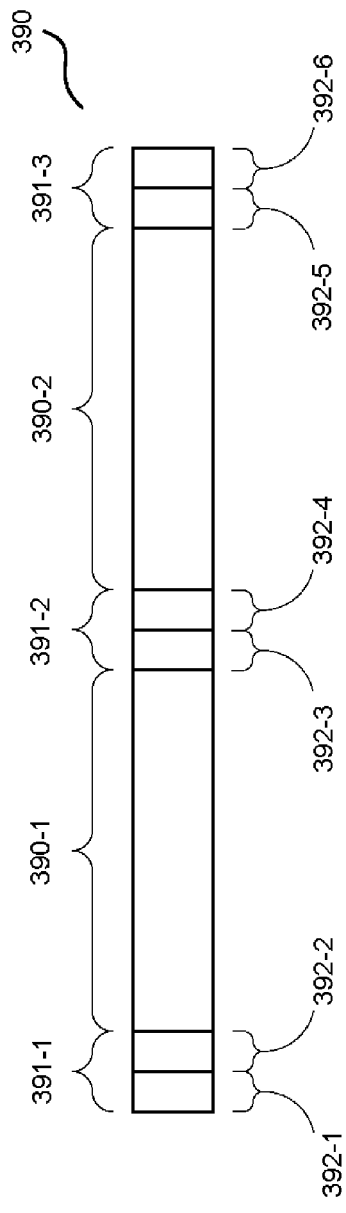
FIG. 6 is a flowchart of an exemplary process for determining effectiveness of asset insertion in VOD content.

To illustrate the insertion of assets into content, FIG. 6 shows an exemplary timing diagram of content 390 interlaced with asset timeslots 391, also known as "break positions". When the VOD 203 receives a message from the CPE 157 for the content 390, the VOD 203 retrieves the content 390 from the content database 374. The content 390, in this embodiment, is divided into two segments 390-1 and 390-2 with timeslots 391 disposed at the front end of the content 390-1 (i.e., timeslot 391-1 at the pre roll position), in between the content segments 390-1 and 390-2 (i.e., timeslot 391-2 at the mid roll position), and at the end of the content segment 390-2 (i.e., timeslot 391-3 at the post roll position). Each timeslot 391 is divided into two asset placement timeslots 392 (i.e., asset placement opportunities), each of which is capable of accepting an asset that is typically, but not always, 30 seconds in duration. Thus, a placement opportunity is generally a subset of time of a particular timeslot 391. The VOD asset insertion decision system 250 directs the VOD 203 to insert the assets according to a particular ranking that provides value for the content provider (e.g., monetary value, enhanced relationships with asset providers, etc.). In this regard, the VOD asset insertion decision system 250 may direct the VOD 203 to select assets from the national asset database 106 and/or the local asset database 375 for insertion into the asset timeslots 392-1-392-6 based on the ranking provided by the VOD asset insertion decision system 250.

Also, the invention is not intended be limited to any particular number of content segments 390 or any particular number of asset timeslots. In fact, an asset timeslot 392 may be subdivided for insertion of multiple assets. For example, television commercials are typically 30 seconds in length. Occasionally, however, asset providers reduce the material of certain assets to reduce the overall duration of a particular asset (e.g., by removing material from a 30 second commercial to reduce it to a 15 second commercial). Accordingly, a 30 second asset timeslot 392 may be configured to accept insertions of two 15 second assets. For example, in FIG. 6, the content 390 may be configured with the mid roll timeslot 391-2 having two 30 second asset timeslots 392-3 and 392-4. The asset timeslot 392-3 can thus be further divided into two 15 second asset timeslots 392-3-1 and 392-3-2, allowing for the insertion of two 15 second assets into the asset timeslot 392-3. Still, the invention is not intended to be limited to any particular asset duration, asset timeslot 392 duration, or timeslot 391 duration as such may be configured to meet certain business and/or technical needs.

It should be noted that the decisions regarding the direction of asset insertions occur quite rapidly. For example, the VOD asset insertion decision system 250 may be operable to make asset insertion decisions for a plurality of headends 101. And, each headend 101 may be operable to provide VOD content to a plurality of CPEs 157 at any given time, possibly thousands or more. Thus, when a VOD content selection is made by a particular CPE 157, the VOD asset insertion decision system 250 responds in substantially real time to ensure that the VOD 203 has ample time to retrieve and insert the assets while processing the content selected by the CPE 157.

Figure 7:
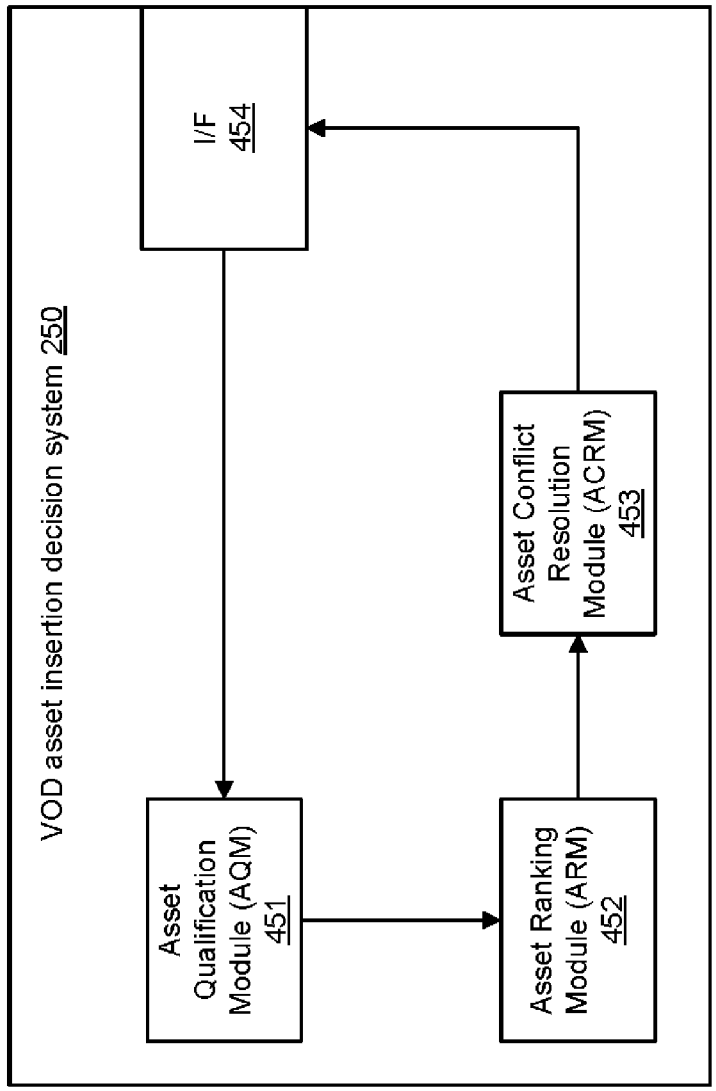
FIG. 7 is a block diagram of an exemplary asset inserter.

FIG. 7 is a block diagram of an exemplary VOD asset insertion decision system 250. In this embodiment, the VOD asset insertion decision system 250 includes an interface 454, an asset qualification module (AQM) 451, an asset ranking module (ARM) 452, and an asset conflict resolution module (ACRM) 453. The interface 454 is any device or system operable to receive information pertaining to a content selection by a CPE 157 such that the VOD asset insertion decision system 250 may direct asset insertion into the selected content. In this regard, the interface 454 may also be operable to transfer information to the VOD 203 to direct the VOD system 203 to insert certain assets from the national asset database 376 and/or the local asset database 375.

The AQM 451 is any device or system operable to communicate with the interface 454 to initially qualify assets for insertion within the content. The AQM 451 may exclude certain assets from insertion into the content selected by the CPE 157. The ARM 452 is any device or system operable to rank the remaining assets (i.e., those not already excluded by the AQM 451) for insertion to the content 390. The ACRM 453 is any device or system operable to remove any ranked assets from insertion into the content 390 based on conflicts between assets. For example, the ACRM 453 may determine that assets from certain advertisers conflict with one another (e.g., Coke and Pepsi). Accordingly, the ACRM 453 may be operable to prevent assets from these advertisers from being inserted within a same timeslot 391 or even within a same content 390. The exemplary operations of the AQM 451, the ARM 452, and the ACRM 453 are explained in greater detail below.

Figure 8:
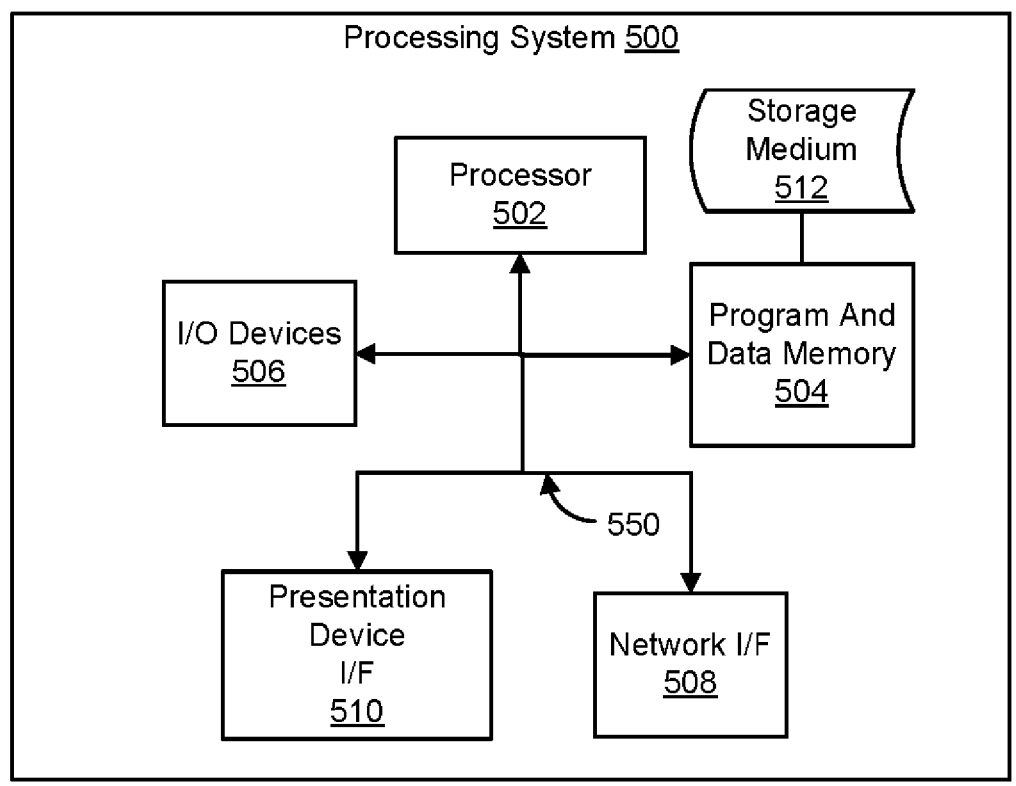
FIG. 8 is a block diagram of an exemplary processing system operable to determine effectiveness of asset insertions in VOD content.

FIG. 8 is a block diagram depicting a processing system 500 also operable to provide the above features by executing programmed instructions and accessing data stored on a computer readable storage medium 512. In this regard, embodiments of the invention can take the form of a computer program accessible via the computer-readable medium 512 providing program code for use by a computer or any other instruction execution system. For the purposes of this description, computer readable storage medium 512 can be anything that can contain, store, communicate, or transport the program for use by a computer.

The computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 500, being suitable for storing and/or executing the program code, includes at least one processor 502 coupled to memory elements 504 through a system bus 550. Memory elements 504 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 506 (including but not limited to keyboards, displays, pointing devices, etc.) can be coupled to the processing system 500 either directly or through intervening I/O controllers. Network adapter interfaces 508 may also be coupled to the system to enable the processing system 500 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation devices, such as printing systems and displays for presentation of presentation data generated by the processor 502.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

Additionally, although the term "headend" generally suggests the distribution center or office of a cable television operator or MSO, the term is not intended to be so limited. The term headend as used herein is any system operable to deliver content to a viewer (e.g., a customer or user of the CPE). For example, the term headend may encompass satellite content providers that offer VOD content and/or Internet services to its subscribers. That content is typically delivered directly to the subscriber's antenna for demodulation and decryption by the subscriber's CPE 157. Internet traffic in such a system may be conveyed by satellite and/or other delivery mechanisms (e.g., digital subscriber lines, or "DSL", delivered through subscriber phone lines).

A headend may also refer to a telecom provider that distributes content to mobile phones and other devices. Also, the term "asset", as used herein, includes any type of media for which an owner desires promotion. Examples of such include traditional television commercials, advertisements, streaming video commercials, promotional materials, marketing information, and the like. The term "content", as used herein, is any type of media, such as audio and/or video, in which assets may be inserted. For example, the content operable within the VOD delivery systems described herein may be streamed Internet audio/video, analog cable television feeds, digital cable television feeds, digital satellite television feeds, or digital satellite radio feeds. Thus, the content of the VOD described herein is intended to encompass Video on Demand (VOD) and pay-per-view (PPV) delivered by both modern cable television and satellite television.

What is claimed is:

1. A system operable to determine effectiveness of asset insertion in Video On Demand (VOD) content, the VOD content being selected by a user through a Customer Premises Equipment (CPE), the system comprising:
an engagement detector operable to analyze upstream internet traffic through a cable television network, to identify household identifications (HHIDs) from the upstream internet traffic, and to detect an internet website selected by the user from the upstream internet traffic based on the user's HHID; and
an asset association module communicatively coupled to the engagement detector and to a VOD asset insertion system of a headend in the cable television network, wherein the asset association module is operable to detect a video asset inserted into the VOD content selected by the CPE, to associate the internet website with the inserted video asset, to determine a period of time between insertion of the video asset and the selection of the internet website by the user, and to determine an effectiveness of the video asset based on the determined period of time,
wherein the asset association module is operable to determine the effectiveness of the video asset based on an additive hazard attribution model.

2. The system of claim 1, wherein:
the asset association module is further operable to direct the VOD asset insertion system to insert the video asset into another VOD content selected by the CPE based on the determined effectiveness of the video asset.

3. The system of claim 1, further comprising:
a database comprising demographic information of a plurality of other users having CPEs coupled to a Cable Modem Termination System (CMTS),
wherein the asset association module is further operable to determine an identity of the user, to determine demographic information of the user, and to recommend insertion of the video asset into VOD selections of a set of the other users having demographic information that is similar to the determined demographic information of the user.

4. The system of claim 1, wherein:
the system is further operable to privatize the upstream internet traffic of the first household.

5. The system of claim 1, further comprising:
an Asset Insertion Decision System operable to rank and qualify the video asset from a plurality of video assets prior to insertion.

6. The system of claim 1, wherein:
the asset association module is further operable to determine the effectiveness of the video asset by iteratively estimating decay parameters of channels using collected channel viewing data and sales data.

7. A method of determining effectiveness of asset insertion in Video On Demand (VOD) content, the method comprising:
detecting a video asset inserted into a VOD content selected by a customer premise equipment (CPE);
processing upstream internet traffic from a plurality of households;
identifying a household identification (HHID) of a first of the households from the upstream internet traffic;
detecting an internet website selected by the first household from the upstream internet traffic;
associating the internet website with the inserted asset;
determining a period of time between insertion of the video asset and selection of the internet website; and
determining an effectiveness of the video asset based on the determined period of time based on an additive hazard attribution model.

8. The method of claim 7, further comprising:
directing the VOD asset insertion system to insert the video asset into another VOD content selected by the CPE based on the determined effectiveness of the video asset.

9. The method of claim 7, further comprising:
determining an identity of the user;
determining demographic information of the user;
identifying a plurality of other users having CPEs coupled to a Cable Modem Termination System (CMTS) from a database of demographic information, wherein the identified other users have demographic information that is similar to the identified user; and
recommending insertion of the video asset into VOD selections of the identified other users.

10. The method of claim 7, further comprising:
privatizing the upstream internet traffic of the first household.

11. The method of claim 7, further comprising:
ranking and qualifying the video asset from a plurality of video assets prior to insertion.

12. The method of claim 7, wherein:
determining the effectiveness of the video asset comprises iteratively estimating decay parameters of channels using collected channel viewing data and sales data.

13. A non-transitory computer readable medium comprising instructions that, when directed by a processor in a Video On Demand (VOD) architecture, directs the processor to determine effectiveness of asset insertion in VOD content, the instructions further directing the processor to:
detect a video asset inserted into a VOD content selected by a customer premise equipment (CPE);
process upstream internet traffic from a plurality of households;
identify a household identification (HHID) of a first of the households from the upstream internet traffic;
detect an internet website selected by the first household from the upstream internet traffic;
associate the internet website with the inserted asset;
determine a period of time between insertion of the video asset and selection of the internet website; and
determine an effectiveness of the video asset based on the determined period of time based on an additive hazard attribution model.

14. The computer readable medium of claim 13, wherein the instructions that direct the processor to determine the effectiveness of the video asset by iteratively estimating decay parameters of channels using collected channel viewing data and sales data.

15. The computer readable medium of claim 13, further comprising instructions that direct the processor to:
direct the VOD asset insertion system to insert the video asset into another VOD content selected by the CPE based on the determined effectiveness of the video asset.

16. The computer readable medium of claim 13, further comprising instructions that direct the processor to:
determine an identity of the user;
determine demographic information of the user;
identify a plurality of other users having CPEs coupled to a Cable Modem Termination System (CMTS) from a database of demographic information, wherein the identified other users have demographic information that is similar to the identified user; and
recommend insertion of the video asset into VOD selections of the identified other users.

17. The computer readable medium of claim 13, further comprising instructions that direct the processor to:
privatize the upstream internet traffic of the first household.

18. The computer readable medium of claim 13, further comprising instructions that direct the processor to:
rank and qualify the video asset from a plurality of video assets prior to insertion.

* * * * *